United States Patent [19]

Weberndoerfer et al.

[11] Patent Number: 4,770,743
[45] Date of Patent: Sep. 13, 1988

[54] ENGINE SIZE FOR PAPER, BASED ON FATTY ALKYL DIKETENES AND CATIONIC POLYACRYLAMIDES

[75] Inventors: Volkmar Weberndoerfer, Mannheim; Enrique Freudenberg, Ludwigshafen; Hans-Juergen Degen, Lorsch; Ulrich Riebeling, Schifferstadt, all of Fed. Rep. of Germany

[73] Assignee: BASF Aktiengesellschaft, Rheinland-Pfalz, Fed. Rep. of Germany

[21] Appl. No.: 71,772

[22] Filed: Jul. 10, 1987

[30] Foreign Application Priority Data

Aug. 1, 1986 [DE] Fed. Rep. of Germany ....... 3626160

[51] Int. Cl.$^4$ .............................................. D21H 3/10
[52] U.S. Cl. ..................... 162/158; 106/243; 106/287.23; 106/287.24; 162/168.2; 162/168.3; 162/168.4; 162/168.5; 162/179; 252/311

[58] Field of Search ................. 162/158, 164.6, 168.2, 162/168.3, 168.4, 168.5, 179; 106/243, 287.23, 287.24; 252/311

[56] References Cited

U.S. PATENT DOCUMENTS 3,130,118  4/1964  Chapman .
3,323,980  6/1967  Poschmann et al. ............. 162/168.2
3,329,560  7/1967  Von Schickh et al. .
4,243,481  1/1981  Dumas .
4,317,756  3/1982  Dumas .

*Primary Examiner*—Peter Chin
*Attorney, Agent, or Firm*—Oblon, Fisher, Spivak, McClelland & Maier

[57] ABSTRACT

Engine sizes for paper are based on aqueous emulsions of $C_{14}$–$C_{20}$-alkyl diketenes and cationic copolymers of
(a) from 40 to 99% by weight of acrylamide and/or methacrylamide,
(b) from 1 to 40% by weight of an unsubstituted or substituted N-vinylimidazoline and
(c) from 0 to 30% by weight of an unsubstituted or substituted N-vinylimidazole.

6 Claims, No Drawings

ENGINE SIZE FOR PAPER, BASED ON FATTY ALKYL DIKETENES AND CATIONIC POLYACRYLAMIDES

German Pat. No. 1,148,130 discloses an aqueous starch/ketene dimer emulsion for sizing paper or paper stock. The ketene dimer is emulsified in water with the aid of a cationic, amine-modified starch. Papers which are engine sized with these emulsions do not develop full sizing directly after the paper drying process in the paper machine but only after storage of the papers at room temperature for one or more days. In practice, however, sizes are required which display virtually their full sizing effect directly after drying of the size paper in the paper machine.

German Laid-Open Application DOS 3,000,502 discloses the use, as a size, of aqueous emulsions of a hydrophobic size which is reactive to cellulose, eg. a fatty alkyl diketene, in the form of a mixture with a cationic polymer. Examples of suitable cationic polymers are reaction products of epichlorohydrin with a condensate of dicyanodiamide or cyanamide and a bisaminopropylpiperazine or condensates of epichlorohydrin and bisaminopropylpiperazine. The cationic polymers accelerate the sizing process of fatty alkyl diketenes. In the case of papers sized with these emulsions, the liming effect is displayed in the paper machine itself during the drying process, but the whiteness of the paper is adversely affected by the cationic condensates present in the emulsions.

Furthermore, German Laid-Open Application DOS 3,235,529 discloses that paper can be sized with fatty alkyl diketenes in the paper machine itself if mixtures of emulsions of $C_{14}-C_{20}$-dialkyl ketenes and finely divided polymeric dispersions containing nitrogen-containing monomers as copolymerized units are used.

German Laid-Open Application DOS 3,316,179 discloses the use of emulsions of fatty alkyl diketenes and polyethyleneimines and/or special water-soluble condensates based on water-soluble polyamidoamines as sizes for paper. In the case of these size mixtures too, the sizing effect of the diketene develops in a short time.

However, the cationic sizing accelerators used to date for the fatty alkyl diketenes are very sensitive to interfering substances which accumulate during the papermaking process in the paper factories, owing to the partially or completely closed water circulations. The interfering substances are, for example, anionic oligomers and polymers. This has an adverse effect on the activity of the cationic products, so that the sizing effect is not developed so rapidly or the amount of cationic sizing accelerator has to be greatly increased in order to achieve development of the sizing effect which is just as rapid as that possible with a paper stock which is free of interfering substances.

It is an object of the present invention to provide an agent for accelerating the development of the sizing effect of fatty alkyl diketenes which is substantially independent of interfering substances and is capable of developing the sizing effect of the diketene in the paper machine during drying of the paper. It is a further object of the invention to provide novel polymers which accelerate engine sizing of paper with alkyl diketenes and whose activity is relatively independent of the content of interfering substances in the paper stock to be drained.

We have found that these objects are achieved, according to the invention, by a paper size based on an aqueous emulsion of $C_{14}-C_{20}$-alkyl diketenes and a cationic polymer if the cationic polymer used is a copolymer of (a) from 40 to 99% by weight of acrylamide and/or methacrylamide,
(b) from 1 to 40% by weight of an unsubstituted or substituted N-vinylimidazoline and
(c) from 0 to 30% by weight of an unsubstituted or substituted N-vinylimidazole which has a K value of from 70 to 150 (determined according to H. Fikentscher in 5% strength aqueous sodium chloride solution of 20° C. and at a polymer concentration of 0.5% by weight). Particularly rapid development of the sizing effect of the diketene is obtained using a terpolymer of (a) from 70 to 96.5% by weight of acrylamide or methacrylamide,
(b) from 2 to 20% by weight of N-vinylimidazoline or N-vinyl-2-methylimidazoline and
(c) from 1.5 to 10% by weight of N-vinylimidazole which has a K value of from 70 to 250.

The diketenes used are $C_{14}-C_{20}$-alkyl diketenes in emulsified form. The preparation of the diketenes and of the diketene emulsions is known. Products of this type are commercially available. The diketenes are prepared, for example, by eliminating hydrogen chloride from the corresponding fatty acid chlorides by reaction with tertiary amines. Diketenes which are particularly important industrially are obtained from fatty acids of 14 to 18 carbon atoms. Industrial fatty acid mixtures, such as industrial stearic acid, which predominantly consists of stearic acid and palmitic acid, are particularly suitable. Emulsions can be prepared by emulsifying the diketenes in water in a conventional manner with the aid of cationic starch. The concentration of the $C_{14}-C_{20}$-alkyl diketenes in the aqueous emulsions is from 4 to 12, preferably from 6 to 10, % by weight. The cataionic starch is used in amounts of from 1 to 3% by weight, based on the emulsion.

The cationic polymers to be used for a monomer of development of the sizing effect contain, as a monomer of group (a), from 40 to 99% by weight of acrylamide or methacrylamide or mixtures of acrylamide and methacrylamide in any ratio. The cationic polymers contain, as a monomer of group (b), from 1 to 40, preferably from 2 to 20, % by weight of an unsubstituted or substituted N-vinylimidazoline. The monomers of group (b) can be defined, for example, by the following formula:

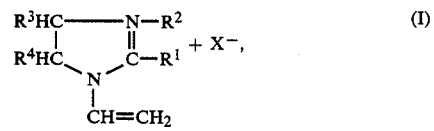

where
$R^1$ is, H, $C_1-C_{18}$-alkyl or

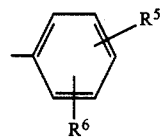

$R^5$ and $R^6$ are each H, $C_1-C_4$-alkyl or CL, $R^2$ is H, $C_{1-C_{18}}$-alkyl,

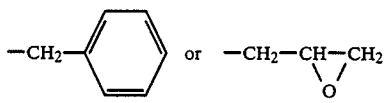

$R^3$ and $R^4$ are each H or $C_{1-C_4}$-alkyl and $X^-$ is an acid radical.

1-Vinyl-2-imidazoline salts of the formula II

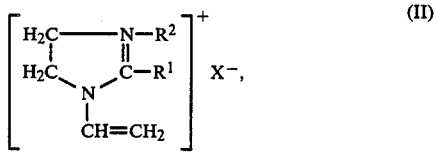

where $R^1$ is H, $CH_3$, $C_2H_5$, n- or i-$C_3H_7$ or $C_6H_5$ and $X^-$ is an acid radical, are preferably used in the polymerization. $X^-$ is preferably $CL^-$, $Br^-$, $SO_4^{2-}$, $CH_3O—SO_3H^-$, $C_2H_5—O—SO_3H^-$ or $R^1—COO^-$ and $R^2$ is H, $C_1-C_4$-alkyl or aryl.

The substituent $X^-$ in the formulae I and II can in principle be any acid radical of an inorganic or organic acid. The monomers of the formula I are obtained by neutralizing the free base, ie. 1-vinyl-2-imidazoline, with the equivalent amount of an acid. The vinylimidazolines can also be neutralized with, for example, trichloroacetic acid, benzenesulfonic acid or toluenesulfonic acid. In addition to salts of 1-vinyl-2-imidazolines, quaternized 1-vinyl-2-imidazolines are also suitable. They are prepared by reacting 1-vinyl-2-imidazolines, which may be unsubstituted or substituted in the 2-, 4- and 5-position, with known quaternizing agents. Examples of suitable quaternizing agents are $C_1-C_{18}$-alkyl chlorides or bromides, benzyl chloride, benzyl bromide, epichlorohydrin, dimethyl sulfate and diethyl sulfate. Preferably used quaternizing agents are epichlorohydrin, benzyl chloride, dimethyl sulfate and methyl chloride.

Preferably used monomers of group (b) are N-vinylimidazoline and N-vinyl-2-methylimidazoline. The monomers of group (b) are present in an amount of from 1 to 40, preferably from 2 to 20, % by weight, based on the copolymer.

N-Vinylimidazoles are used as monomers of group (c). Compounds of this group can be defined, for example, by the following formula:

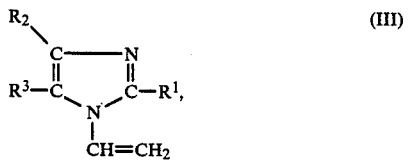

where $R^1$, $R^2$ and $R^3$ are each H or $CH_3$ and $R^1$ may furthermore be $C_2H_5$, $C_2H_7$ or $C_4H_9$.

Unsubstituted N-vinylimidazole is preferably used as a monomer of group (c). The sum of the percentages of the copolymerized monomers (a) to (c) in the copolymers is always 100.

Terpolymers of (a) from 70 to 96.5% by weight of acrylamide or methacrylamide, (b) from 2 to 20% by weight of N-vinylimidazoline or N-vinyl-2-methylimidazoline and (c) from 1.5 to 10% by weight of N-vinylimidazole, having a K value of from 70 to 250 (determined according to H. Fikentscher in 0.5% strength aqueous sodium chloride solution at 20° C. and at a polymer concentration of 0.5% by weight), are novel substances and are preferably used for accelerating sizing by means of diketenes in a paper stock containing interfering substances. For such a paper stock system, an advantageous effect is also achieved using copolymers of (a) from 40 to 99% by weight of acrylamide and/or methacrylamide, (b) from 1 to 40% by weight of an unsubstituted or substituted N-vinylimidazoline and (c) from 0 to 30% by weight of an unsubstituted or substituted N-vinylimidazole if copolymers having a K value of from 70 to 150 are used. In the case of the copolymers, the sum of the percentages of (a) to (c) is always 100. The cationic copolymers are soluble in water. They are added to the paper stock to be drained in the form of a mixture with the alkyl diketene. However, the alkyl diketene and cationic copolymer can also be added to the paper stock separately from one another. Since the components are mixed thoroughly in the paper stock, sizing of the paper with the alkyl diketene always takes place in the presence of the cationic copolymer to be used according to the invention. In this procedure, it is immaterial whether the fatty alkyl diketene is added first to the paper stock or the cationic copolymer is introduced into the paper stock as the first component of the size mixture. From 20 to 200 parts by weight of the copolymers to be used according to the invention are employed per 100 parts by weight of alkyl diketene.

The copolymers are prepared by copolymerization of the monomers (a), (b) and, if required, (c) at up to 100° C. in the presence of free radical polymerization initiators or by the action of high-energy radiation. The copolymerization can be carried out by a conventional process. Since aqueous solutions of the copolymers are used, it is simplest, with regard to the use of the copolymers, to prepare them by copolymerizing the monomers in aqueous solution. Other possible methods of preparing the polymers comprise carrying out the copolymerization in a water-in-oil emulsion or by reverse suspension polymerization. The last-mentioned process gives finely divided bead polymers which can readily be isolated in pure form. Both the water-in-oil emulsion polymerization method and the reverse suspension polymerization method permit the preparation of copolymers having a very high molecular weight, ie. polymers having a K value of up to 250. Polymers having lower molecular weights, ie. K values of from 70 to 150, are prepared by carrying out the polymerization in the presence of a conventional polymerization regulator. Examples of suitable polymerization regulators are $C_1-C_4$-alcohols, mercaptans, such as dodecyl mercaptan, 2-mercaptoethanol and thioglycolic acid. The stated polymerization processes can be carried out batchwise, semicontinuously or continuously.

Preferably used polymerization initiators are water-soluble compounds which provide free radicals, eg. hydrogen peroxide, alkali metal peroxydisulfates and water-soluble organic peroxides, hydroperoxides and azo compounds, eg. 2,2'-azobis-(2-amidinopropane) dihydrochloride, 2,2'-azobis-(N,N'-dimethyleneisobutyramidine) dihydrochloride and 2,2'-azobis-(2,4-dimethylvaleronitrile). It is possible to use not only mixtures of polymerization initiators but also redox catalysts, eg. sodium sulfite/ammonium persulfate/- sodium bromate, sodium sulfite/ascorbic acid/potassium peroxydisulfate, hydrogen peroxide/iron(II) salts or potassium peroxydisulfate/iron(II) salts.

In the Examples, parts and percentages are by weight. The K values were determined according to H. Fikentscher, Cellulosechemie 13 (1932) 48–64 and 71–74, in 5% strength aqueous sodium chloride solution at 20° C. and at a polymer concentration of 0.5% by weight. The quality of the sizing effect was determined with the aid of the Cobb value according to DIN 53,132 and the ink flotation test (50% strike-through). The tests were carried out in each case immediately after sheet formation and after conditioning of the sheets for 3 days. The following sizes were used:

Size 1 (comparison 1) 6% strength aqueous emulsion of distearyl diketene, stabilized with 2% of commercial cationic starch.

Size 2 (comparison 2 according to German Laid-Open Application DOS 3,316,179)

Mixture of 6% strength aqueous distearyl diketene emulsion, 2% of commercial cationic starch and 10% of a water-soluble condensate of adipic acid and diethylenetriamine, which is grafted with 50 parts by weight of ethyleneimine per 100 parts by weight of polyamidoamine and reacted with a difunctional crosslinking agent obtainable by reacting epichlorohydrin with polyethylene glycol containing 34 ethylene oxide units.

Size 3 (according to the invention)

Mixture of 6% strength of aqueous distearyl diketene emulsion, 2% of commercial cationic starch and 10% of the terpolymer described in Example 1, consisting of 85.8% of acrylamide, 11.1% of N-vinyl-2-methylimidazoline and 3.1% of N-vinylimidazole and having a K value of 116.

Size 4 (according to the invention)

Mixture of 6% strength aqueous stearyl diketene emulsion, 2% of commercial cationic starch and 10% of a copolymer of 81.5% of acrylamide and 18.5% of N-vinyl-2-methylimidazoline.

EXAMPLE 1

Preparation of a terpolymer of 85.8% of acrylamide, 11.1% of N-vinyl-2-methylimidazoline and 3.1% of N-vinylimidazole.

708.5 parts of water, 15 parts of sodium acetate, 1.7 parts of the pentasodium salt of diethylenetriaminepentaacetic acid, 20 parts of a 1% strength aqueous sodium bromate solution, 6.7 parts of concentrated sulfuric acid, 173.2 parts of a 50% strength aqueous acrylamide solution and 2.87 parts of N-vinylimidazole are initially taken in a 2 L three-necked flask equipped with a stirrer, a reflux condenser, a dropping funnel and an apparatus for working under nitrogen, and 10.06 parts of N-vinyl-2-methylimidazoline are added at from 18 to 23° C. In order to remove the residual oxygen from the initially taken mixture, nitrogen is passed through. After about 10 minutes, a solution of 0.2 part of sodium bisulfite in 60 parts of water is then added uniformly in the course of 25 minutes. The polymerization, which takes place at from 18 to 23° C., is complete 2 hours after the addition of the reducing agent, the heat being removed by cooling with a waterbath. A 10% strength aqueous solution of a copolymer having a K value of 116 is obtained.

EXAMPLE 2

A paper stock is prepared from 100% of bleached birch sulfate pulp, with the addition of 40% of chalk. the freeness is 35° SR (Schopper-Riegler). This paper stock is divided into 3 parts, each of which is mixed with substances which occur in practice in closed water circulations of paper machines and which interfere with the sizing process:

(a) wood extract
(b) polyacrylic acid having a K value of 25 (used as a dispersant)
(c) anionic starch.

The particular sizes stated in Tables 1 to 3 are then added to these three model substances (a), (b) and (c), and sheets having a weight of 100 g/m³ are formed on a Rapid Köthen sheet former after the addition of 0.3% of a commercial, weakly cationic polyacrylamide having a K value of 130 as a retention aid. The sheets are dried to a residual moisture content of 6–10% on a steam-heated drying cylinder at 90° C. Directly after drying, the preparation absorption, the Cobb value and the ink flotation time are determined. The sheets are then stored for 3 days at 23° C. and at a relative humidity of 50%. Thereafter, the Cobb value and the ink flotation time are determined in each case. The data obtained are likewise shown in Tables 1 to 3 for the model substances (a) to (c).

TABLE 1

(a) Addition of 50 ml of wood extract (lignin degradation products) to 600 ml of paper stock

| | Size | | |
|---|---|---|---|
| | 1 Comparison 1 | 2 Comparison 2 | 4 Example according to the invention |
| Amount added, % solid | | | |
| including % of diketene | 0.12 | 0.12 | 0.12 |
| including % of cationic polymer | — | — | 0.2 |
| including % of crosslinked polyamidoamine | — | 0.2 | — |
| Immediate sizing | | | |
| Water absorption | | | |
| Size press g/m² | 65 | 40 | 25 |
| Cobb$_{60'}$ g/m² | >200 | 100 | 35 |
| 50% strike-through, min | — | 2 | 10 |
| Sizing after conditioning for 3 days | | | |
| Cobb$_{60'}$ g/m² | 27 | 40 | 23 |
| 50% strike-through, min | 37 | 23 | >60 |

TABLE 2

(b) Addition of 0.2% of polyacrylic acid having a K value of 25 to the paper stock, as an interfering substance

| | Size | | |
|---|---|---|---|
| | 1 Comparison 3 | 2 Comparison 4 | 4 Example according to the invention |
| Amount added, % solid | 0.16 | 0.36 | 0.36 |
| including % of diketene | 0.12 | 0.12 | 0.12 |
| including % of cationic polymer | — | — | 0.2 |
| including % of crosslinked polyamidoamine | — | 0.2 | — |
| Immediate sizing | | | |
| Water absorption | | | |
| Size press g/m² | 55 | 37 | 22 |
| Cobb$_{60'}$ g/m² | 136 | 83 | 45 |
| 50% strike-through, min | 1 | 4 | 20 |
| Sizing after conditioning for 3 days | | | |
| Cobb$_{60'}$ g/m² | 40 | 51 | 25 |

TABLE 2-continued (b) Addition of 0.2% of polyacrylic acid having a K value of 25 to the paper stock, as an interfering substance

| | Size | | |
|---|---|---|---|
| | 1 Comparison 3 | 2 Comparison 4 | 4 Example according to the invention |
| 50% strike-through, min | 60 | 10 | >60 |

TABLE 3

(c) Addition of 15% of anionic starch to the paper stock, as an interfering substance

| | Size | | |
|---|---|---|---|
| | 1 Comparison 5 | 2 Comparison 6 | 3 Example according to the invention |
| Amount added, % solid | 0.16 | 0.36 | 0.36 |
| including % of diketene | 0.12 | 0.12 | 0.12 |
| including % of cationic polymer | — | — | 0.2 |
| including % of crosslinked polyamidoamine | — | 0.2 | — |
| Immediate sizing Water absorption | | | |
| Size press g/m² | 40 | 36 | 35 |
| Cobb₆₀' g/m² | 135 | 74 | 35 |
| 50% strike-through, min | — | 15 | 38 |
| Sizing after conditioning for 3 days | | | |
| Cobb₆₀' g/m² | 26 | 50 | 25 |
| 50% strike-through, min | 50 | 20 | >60 |

EXAMPLE 3

A paper stock is prepared from 100% of bleached birch sulfate pulp, with the addition of 40% of chalk. The freeness is 35° SR (Schopper-Riegler). The paper stock has a pH of 7.5 and a consistency of 0.8%. This paper stock is divided into three equal parts, each of which is mixed with the products stated under (a) to (c). These products are known interfering substances in industry, since they have an adverse effect on the sizing effect of the diketene. The following interfering substances were used:
(a) wood extract
(b) polyacrylic acid having a K value of 25
(c) anionic starch.

The sizes stated in Tables 4 to 6 are then added to these three model substances and mixed thoroughly with the paper stock. 0.3% of commercial, weakly cationic polyacrylamide is then added as a retention aid, and paper sheets having a weight of 100 g/m² are prepared using a Rapid Köthen sheet former. The paper sheets are dried to a residual moisture content of 6–10% on a steam-heated drying cylinder at 90° C. Directly thereafter, the preparation absorption, Cobb value and the ink flotation time of these paper sheets are determined. The data obtained and the Cobb values and ink flotation times of sheets which are conditioned for 3 days at 23° C. and at a relative humidity of 50% are likewise shown in Tables 4 to 6.

TABLE 4

(a) Addition of 50 ml of wood extract (lignin degradation products) to 550 ml of paper stock

| | Size | | |
|---|---|---|---|
| | 1 Comparison 7 | 2 Comparison 8 | 3 Example according to the invention |
| Amount added, % solid | 0.16 | 0.36 | 0.36 |
| including % of diketene | 0.12 | 0.12 | 0.12 |
| including % of cationic polymer | — | — | 0.2 |
| including % of crosslinked polyamidoamine | — | 0.2 | — |
| Immediate sizing Water absorption | | | |
| Size press g/m² | 85 | 70 | 27 |
| Cobb₆₀' g/m² | 200 | 150 | 52 |
| 50% strike-through, min | — | 0.2 | 11 |
| Sizing after conditioning for 3 days | | | |
| Cobb₆₀' g/m² | 40 | 55 | 40 |
| 50% strike-through, min | >60 | 25 | >60 |

TABLE 5

(b) Addition of 0.2% of polyacrylic acid having a K value of 25 to the paper stock, as an interfering substance

| | Size | | |
|---|---|---|---|
| | 1 Comparison 9 | 2 Comparison 10 | 3 Example according to the invention |
| Amount added, % solid | 0.16 | 0.36 | 0.36 |
| including % of diketene | 0.12 | 0.12 | 0.12 |
| including % of cationic polymer | — | — | 0.2 |
| including % of crosslinked polyamidoamine | — | 0.2 | — |
| Immediate sizing Water absorption | | | |
| Size press g/m² | 48 | 38 | 24 |
| Cobb₆₀' g/m² | 150 | 85 | 36 |
| 50% strike-through, min | — | 1 | 30 |
| Sizing after conditioning for 3 days | | | |
| Cobb₆₀' g/m² | 40 | 72 | 40 |
| 50% strike-through, min | 60 | 10 | >60 |

TABLE 6

(c) Addition of 15% of anionic starch to the paper stock, as an interfering substance

| | Size | | |
|---|---|---|---|
| | 1 Comparison 11 | 2 Comparison 12 | 3 Example according to the invention |
| Amount added, % solid | 0.16 | 0.36 | 0.36 |
| including % of diketene | 0.12 | 0.12 | 0.12 |
| including % of cationic polymer | — | — | 0.2 |
| including % of crosslinked polyamidoamine | — | 0.2 | — |
| Immediate sizing Water absorption | | | |
| Size press g/m² | 50 | 35 | 19 |
| Cobb₆₀' g/m² | 67 | 70 | 41 |
| 50% strike-through, min | 1 | 10 | 20 |
| Sizing after conditioning for 3 days | | | |
| Cobb₆₀' g/m² | 42 | 57 | 40 |

TABLE 6-continued

| (c) Addition of 15% of anionic starch to the paper stock, as an interfering substance | | | |
|---|---|---|---|
| | Size | | |
| | 1 Comparison 11 | 2 Comparison 12 | 3 Example according to the invention |
| 50% strike-through, min | >60 | >60 | >60 |

As shown in the tables, the addition of the cationic copolymers to be used according to the invention makes it possible to develop the sizing effect of alkyl diketenes directly after drying of the paper sheets, the advantage over the conventional sizing accelerators for fatty alkyl diketenes being that interfering substances present in the system have virtually no adverse influence on the development of the sizing effect. This is particularly evident when the values for the water absorption of the paper and the Cobb value of sheets produced according to the invention are compared with the sheets sized with the aid of size 2.

We claim:

1. A size for paper, based on an aqueous emulsion of a $C_{14}$-$C_{20}$-alkyl diketene, wherein the size contains, per 100 parts by weight of alkyl diketene, 20 to 200 parts by weight of a cationic copolymer of
   (a) from 40 to 99% by weight of acrylamide and/or methacrylamide,
   (b) from 1 to 40% by weight of an unsubstituted or substituted N-vinylimidazoline and
   (c) from 0 to 30% by weight of an unsubstituted or substituted N-vinylimidazole,
   which has a K value of from 70 to 150 (determined according to H. Fikentscher in 5% strength aqueous sodium chloride solution at 20° C. and at a polymer concentration of 0.5% by weight).

2. A size as claimed in claim 1, wherein the cationic copolymer used is a terpolymer of
   (a) from 40 to 96.5% by weight of acrylamide or methacrylamide,
   (b) from 2 to 30% by weight of N-vinylimidazoline or N-vinyl-2-methylimidazoline and
   (c) from 1.5 to 30% by weight of an unsubstituted or substituted N-vinylimidazole.

3. A size as claimed in claim 1, wherein the cationic copolymer used is a terpolymer of
   (a) from 70 to 96.5% by weight of acrylamide,
   (b) from 2 to 20% by weight of N-vinylimidazoline or N-vinyl-2-methylimidazoline and
   (c) from 1.5 to 10% by weight of N-vinylimidazole.

4. A process for the engine sizing of paper, which comprises adding a size based on an aqueous emulsion of a $C_{14}$-$C_{20}$-alkyl diketene and, per 100 parts by weight of alkyl diketene, from 20 to 200 parts by weight of a cationic copolymer of
   (a) from 40 to 99% by weight of acrylamide and/or methacrylamide,
   (b) from 1 to 40% by weight of an unsubstituted or substituted N-vinylimidazoline and
   (c) from 0 to 30% by weight of an unsubstituted or substituted N-vinylimidazole,
   which has a K value of from 70 to 150 (determined according to H. Fikentscher in 5% strength aqueous sodium chloride solution at 20° C. and at a polymer concentration of 0.5% by weight), to the paper stock and draining the latter with sheet formation.

5. The process as claimed in claim 4, wherein the cationic copolymer used is a terpolymer of
   (a) from 40 to 96.5% by weight of acrylamide or methacrylamide,
   (b) from 2 to 30% by weight of N-vinylimidazoline or N-vinyl-2-methylimidazoline and
   (c) from 1.5 to 30% by weight of an unsubstituted or substituted N-vinylimidazole.

6. The process as claimed in claim 4, wherein the cationic copolymer used is a terpolymer of
   (a) from 70 to 96.5% by weight of acrylamide,
   (b) from 2 to 20% by weight of N-vinylimidazoline or N-vinyl-2-methylimidazoline and
   (c) from 1.5 to 10% by weight of N-vinylimidazole.

* * * * *